INVENTORS.
Jesse O. Betterton, Jr.
George D. Kneip, Jr.
Dewey S. Easton
James O. Scarbrough

BY

ATTORNEY.

INVENTORS.
Jesse O. Betterton, Jr.
George D. Kneip, Jr.
Dewey S. Easton
James O. Scarbrough

BY

ATTORNEY.

3,275,480
METHOD FOR INCREASING THE CRITICAL CURRENT DENSITY OF HARD SUPERCONDUCTING ALLOYS AND THE IMPROVED PRODUCTS THEREOF
Jesse O. Betterton, Jr., Oak Ridge, Tenn., George D. Kneip, Jr., Concord, Mass., and Dewey S. Easton and James O. Scarbrough, Lenoir City, Tenn., assignors to the United States of America as represented by the United States Atomic Energy Commission
Filed June 22, 1965, Ser. No. 475,303
17 Claims. (Cl. 148—2)

This application is a continuation-in-part of application Serial No. 219,804, filed Aug. 27, 1962, now abandoned. The invention described herein was made in the course of, or under, a contract with the U.S. Atomic Energy Commission.

The present invention relates to a method for increasing the critical current density of superconducting alloys.

A superconducting metal or alloy is one which loses all detectable resistance to the flow of electrical current below a characteristic critical temperature, current and magnetic field. A parameter used to measure the superconducting capacity of a metal or alloy is the critical current.

The high current-carrying capacity of superconducting materials can be utilized to produce magnetic fields wherever electromagnets can be operated at low temperatures. Similarly, this capacity can be utilized whenever power transmission lines can be operated at low temperatures. The advantage of increasing the critical current density, and hence the current-carrying capacity, of a superconducting material is that the volume of the apparatus needed to achieve a selected electrical current is considerably reduced. In the case of an electromagnet, a selected magnetic field strength and volume is achieved with a smaller volume of apparatus.

It is an object of this invention to provide a method for increasing the current-carrying capacity of a superconducting alloy under superconducting conditions. Another object of this invention is to provide an improved superconducting alloy composition whose current-carrying capacity below its critical temperature and magnetic field has been significantly increased. A further object is to provide an improved superconducting solenoid. Another object is to provide such improved superconducting alloy by the method to be described.

In a co-pending application, S.N. 172,356, of common assignee, now Patent No. 3,215,569, there is described a method for increasing the critical current density of a hard superconducting alloy by annealing a selected superconducting alloy, whose structure consists essentially of a single homogeneous solid solution phase, at a temperature at which an equilibrium phase will develop, as indicated by an equilibrium phase diagram of said alloy, for a sufficient time to effect precipitation of a secondary phase within the volume of the matrix homogeneous solid solution. As used therein, the process of precipitation refers to the generation of a secondary phase other than the initial homogeneous solid solution phase of the treated alloy. This was understood to include the product resulting from the rearrangement (frequently termed "ordering and/or clustering") of the constituent atoms of the homogeneous solid solution when it is heat treated, such as by annealing in the multiphase region of the alloy as shown by its equilibrium phase diagram. The secondary phase comprised, in the main, precipitated particles whose composition and/or size may vary with time at the selected annealing temperature. In another situation, said phase could be particles whose composition could be invariant with time but whose size may vary with time at the selected annealing temperature. The latter particles correspond to the equilibrium composition at the selected precipitating temperature. In still another situation, the secondary phase could comprise a mixture of the two aforesaid phases.

The term "hard" superconductors designates a class of superconducting alloys whose superconductivity is destroyed gradually upon reaching its characteristic critical magnetic field, as contrasted with a "soft" superconductor which is restored to its normal resistance state rather abruptly upon reaching its critical magnetic field.

It is another object of this invention to teach a way of inducing a precipitated phase (in the class of defined hard superconductors) which will result in an increased superconducting current as compared to a hard superconductor which does not contain said precipitated phase.

A further object of this invention is to teach the addition of a certain class of precipitant-inducing additives to hard superconducting alloys for the specific purpose of enhancing the superconducting qualities of said alloys.

The objects of this invention are achieved by a method which in one of its broadest aspects comprises:

(a) mixing in the liquid state a hard superconducting alloy system whose equilibrium phase diagram displays a multiphase region below a substantially homogeneous solid phase with an additive selected from the group oxygen, carbon, nitrogen, boron, and hydrogen, said additive being preferably in the form of a compound of the formula MX where M is an element having an electronegativity value which is less than the electronegativity value of the element comprising the major alloying ingredient of said alloy, and X is selected from oxygen, carbon, nitrogen, boron, and hydrogen;

(b) homogenizing the resultant mixture at a temperature within the homogeneous solid phase region of the original alloy system to erase compositional variations;

(c) heat-treating the homogenized mixture within a multiphase region displayed by said phase diagram for a period of time sufficient to induce precipitation of a secondary phase; and (d) quenching said annealed alloy to retain said secondary phase.

A second aspect of the method just described includes cold-working the alloy containing the precipitation-induced secondary phase. A third aspect of this invention includes the first or second aspects as well as size reduction of the alloy containing the precipitated secondary phase by non-mechanical means, such as chemical milling or etching.

The alloys to which the method of this invention are applicable are formed from elements selected from Group III to VIII of the Periodic Table, as it appears in the 1956 edition of Webster's New Collegiate Dictionary.

For the sake of clarity, it should be pointed out that the element M in the compound MX may be a constituent of the basic alloy being treated or may be introduced into the basic alloy.

The term "electronegativity value" is used here in the same sense defined by L. Pauling in his book, "The Nature of the Chemical Bond," Cornell University Press, 2nd edition.

This invention in its broadest sense applies to any hard superconducting alloy wherein a single solid phase can be obtained at one temperature and which has a miscibility gap and/or multiphase region at a lower range of temperature. Heating or annealing the alloy with the selected additive uniformly dissolved at a temperature or range of temperature within the miscibility gap and/or multiphase region will determine the existence and morphology of the desired secondary phase.

While the process operations involved in the method of this invention are described in terms of an equilibrium phase diagram of the alloy to be treated, it should be clear that the invention will find application to hard superconducting alloys whose phase diagrams are not known or incompletely understood. Therefore, reference to a phase diagram in claiming or explaining our invention is made for the sake of precision in describing the precipitate-inducing region needed to form the desired secondary phase. The gist of our inventive concept lies in the recognition that a secondary phase formed by or with the class of defined precipitant additives in said superconducting alloy will increase the superconducting qualities of said alloys.

Among the binary base alloy systems which are susceptible to improvement in their superconducting qualities by treatment in accordance with this invention are such systems as Nb-U, Nb-Zr, Nb-Ti, UAl, MoTi, MoRe, TiU, Zr-U. Each phase diagram of these alloy systems displays regions of composition wherein a single phase or homogeneous solid can be produced at high temperatures and heat treated, at a lower temperature, to induce precipitation of a desired secondary phase by the addition of oxygen, nitrogen, carbon, boron or hydrogen. Assuming the original or basic alloy is a hard superconductor, the precipitation reaction will then result in enhancement of the superconducting qualities of said basic alloy.

It should be emphasized that in reciting our invention with reference to the phase diagram of the alloy being treated, we do not mean to imply that the secondary phase (resulting from adding the selected additive and heat treating within the stipulated region) will necessarily be displayed on the phase diagram of the alloy being treated. For it is within the scope of this invention to create phase relationships which may be different from those shown by the phase diagram of the alloy being treated. Near stable or metastable phases may be produced. The differences in the phase relationships in the new alloy system may be so relatively minor as to hardly be distinguishable from the phase diagram of the original alloy. On the other hand, the addition of as little as 100 p.p.m. oxygen may, after suitable heat treatment to produce a precipitated phase, result in the creation of a secondary phase containing a significant proportion of oxygen, i.e., from less than 1 to as much as 50% oxygen, by weight. The fact that the precipitated phase is not displayed on or related to the original equilibrium phase diagram of the alloy being treated is of no critical moment. What is important is that the production of such secondary phase will be reflected in the enhanced superconducting quality in the alloy containing said secondary phase.

As just stated, the process of this invention, in effect, consists of two sub-processes which, for the sake of convenience of description, may be termed the precipitation process and the size effect. Each sub-process may be practiced independently of the other, but for achieving maximum improvement in the critical current density of a given superconductor of the described class, it is preferred that the two sub-processes be practiced together in the sequence to be hereinafter more fully described.

PRECIPITATION PROCESS

In general terms, it is known that the ease of fabricating the metals and alloys which form hard superconductors is a function of the amount of so-called interstitial impurities of the metal where such impurities are of the class carbon, oxygen, nitrogen, and hydrogen. That is to say, as the amount of the impurities increases, the fabricability of such metals and alloys decreases. In such cases, it has been fairly well established that the presence of such impurities has a deleterious effect on the physical and mechanical properties of the finally fabricated material. Thus, prior to this invention those skilled in the art of fabricating hard superconductors always chose, with some apparent logic, to use as pure a starting material as was possible to attain, and to maintain such high degree of purity throughout the fabrication process.

In accordance with the present invention, we have found that instead of avoiding the presence of such impurities, their deliberate addition combined with a heat treatment to induce a precipitated phase containing said impurities produces a profound and surprising increase in the critical current density of the particular hard superconductor being so treated. As a matter of convenience, the impurity may be added to a selected hard superconducting alloy as the oxide, carbide, nitride, boride or hydride of one of metals of said alloy. When the oxygen, carbon, nitrogen, boron or hydrogen is added as a metal compound $M(O.C.N.B.H)$ it is preferred that the metal or the compound be one whose electronegativity value is less than the electronegativity value of the metal comprising the major alloying ingredients of the alloy. It is, of course, possible and within the scope of this invention to add the precipitant-inducing impurities in the uncombined form. That is, the impurity may be added to a selected alloy as gaseous oxygen, nitrogen or hydrogen or as elemental boron or carbon. However, this manner of addition sometimes presents practical difficulties in that it is somewhat more difficult to control the amount of addition with the desired or required degree of exactitude, especially when the additive is in gaseous form.

The basic operations for inducing the profound increase in critical current density with a specified amount of precipitant-inducing additive are exceedingly simple. A selected hard super-conducting alloy containing a specified amount of a precipitant-inducing additive is formed in the liquid state. The resultant alloy mixture is then cooled to below its melting point and homogenized to insure uniform distribution of the added impurity. The homogenized alloy mixture is then cooled or annealed at a temperature below the homogenization temperature to produce a finely divided and uniformly distributed precipitate throughout the volume of the alloy. A hard superconductor treated in this manner will be found to have a critical current density which is higher than a superconductor not so treated.

As a practical matter, most useful superconducting materials are fabricated into wires which can be wound into solenoids of various shapes. It should be noted here that the critical current density of superconducting alloys can be increased by cold working. For example, the mechanical cold working applied to superconducting alloys required to form them into wires which can be suitable for winding into solenoids will impart an increased measure of superconductivity to the alloy so treated. However, in cases where the described precipitated phase is induced in superconducting alloys which have had a history of cold working prior to and/or after induction of said precipitated phase, the superconducting properties of such cold-worked alloys will be found to have been further improved compared to that improvement attributed to cold working alone. Thus, in one of its preferred aspects, the present invention contemplates a process for fabricating hard superconductors containing the desired induced precipitation phase and whose metallurgical history may include mechanical working operations such as cold swaging, either before and/or after the formation of the desired precipitated phase.

As previously noted, the introduction of the combined (as a compound) or uncombined oxygen, carbon, nitrogen, boron, and hydrogen can be expected to damage the fabricability or workability of the designated superconducting alloy while increasing its critical current density. For this reason, and for the reason that the decrease in fabricability and increase in critical current density will generally be found to proceed at different rates, it is not possible to state with discrete accuracy a specific concentration range of the selected additive which can be tolerated for purposes of increasing critical current density of the treated alloy while not yet rendering the alloy completely unworkable. In some cases, it may be possible to add as much as several thousand parts per million of a selected oxide or carbide, for example, to improve the superconductivity of the alloy while yet retaining sufficient fabricability to enable the treated alloy ingot to be worked to a desired size. Therefore, in cases where the beneficial effects of cold working are sought to be combined with the beneficial effects of an alloy containing the desired precipitated phase, the amount of selective additive needed to induce formation of a desired precipitated phase should not exceed that amount which will effectively destroy the fabricability or workability of the alloy being so treated.

In order to avoid or at least ameliorate the fabricability problem which may be presented by the precipitant-inducing additive, the superconductor may be formed by powder metallurgical techniques. Thus, for example, where it is desired to increase the superconductivity of a niobium-zirconium superconducting alloy by the use of zirconium oxide addition in sufficient amounts to increase the critical current density of that alloy by formation of an oxide-containing precipitated phase, the alloy can be formulated by homogeneously mixing zirconium powder with niobium powder in the desired amounts together with either niobium oxide or zirconium oxide. The resultant mixture may then be sintered and extruded through high temperature-resistant dies to form a wire of a desired size. The induced oxide-containing precipitated phase may then be created by cooling or annealing the mixture at a temperature in the range 200° C. to 1000° C., preferably in the range 800° C. to 1000° C. The precipitated phase will still be finely divided, a form which is thought to be most beneficial for achieving maximum increases in the critical current density of the treated alloy, if the time of heat treatment is short.

The inventive concept of utilizing a precipitated phase induced by additives of the defined class combined with either etching or other non-mechanical means once the saturation point of current density increase by normal cold working has been reached are applicable to alloys which are ductile as well as those which are non-ductile. The ductile alloys are selected generally from metals of the body-centered cubic crystal form from metals of Groups IVa, Va, VIa and elements of Groups III to VIII. Typical of the binary alloy systems in this class are TiN, TiNb, TiTa, TiCr, TiMo, TiW, TiU, ScNb, ZrNb, Hf-Ta and Hf-Nb. Such ductile alloys can be processed by any combination of steps of (a) liquid solution of the MX additive followed by solidification, (b) cold working, (c) homogenization heat treatment, (d) cold working, (e) precipitation of MX containing phase, (f) cold working to small diameter, and (g) etching to smaller diameter, so long as the MX containing precipitated phase is produced. This is in spite of the fact that the ternary phase diagram, for example, Ti-Nb-X where X is O, C, N, H and B, may not be known. All that is necessary to know is that a multiphase region exists of some Ti-Nb-X compositions. Of course, there are ways of fabricating the ductile-type superconducting alloys to increase critical density other than by powder metallurgical techniques. Namely, one can cast the desired alloy in such a way that the alloy was homogeneous in the MX additive and then cold work, precipitate the MX containing phase and finally worked to smaller rod or wire size.

For the non-ductile hard superconducting alloys such as $Nb_3Sn$, $V_3Cr$, $V_3Ga$, $V_3Si$ and $Nb_3Al$ of the beta tungsten structure, the cold working is usually not possible and steps (b), (d) and (f) are eliminated. Such alloys can be made by diffusion (step c). This can be done either by (1) heat treatment of cold sintered powder mixtures A and B inside metal tube B or vice versa where A and B are the constituents of alloy system AB, (2) thermal decomposition of a halide vapor of A halide and B halide on a hot filament, (3) by applying metal A on metal B or vice versa, or (4) by evaporating B onto metal A or vice versa, and then heating the whole to diffuse and homogenize the resulting alloy. In fabricating the non-ductile alloys, the temperature of precipitation of the MX phase should be kept below the recrystallization temperature.

Having described the process of increasing the critical current density of hard superconductors by use of selected precipitant-inducing additives, and having defined the class of alloys to which this invention may be advantageously applied, the following exemplary embodiment will demonstrate the improvement achieved with a specific hard superconductor consisting of a niobium base alloy containing 25% by weight zirconium. The example which illustrates the marked improvement in current density achieved by inducing the required precipitated phase will be discussed and more clearly understood by referring to the following drawings, in which

In all of the following examples, the amount of cold working will refer to percentage reduction in area of the preceding heat treatment. The reduction in area effected by the cold working or other mechanical workings is related to diameter of the treated specimen by the following equation:

$$\text{Reduction in Wire} = \left[1 - \left(\frac{d_f}{d_o}\right)^2\right] \times 100$$

where:

$d_o$ = the initial diameter of the alloy to be fabricated
$d_f$ = the final diameter of the alloy.

Critical current density measurements of the fabricated wire specimens in all cases were made in liquid helium at 4.2° K. with a magnetic field provided by a superconducting magnet creating a magnetic field transversely to the current flow induced in the wire test specimen. The amount of cold work, unless otherwise specified, between the homogenization and the precipitation-annealing operation, was kept essentially constant for all of the test specimens to be discussed.

Example I

A niobium-base alloy approximately 0.493 inch in diameter and containing 25 weight percent zirconium was prepared from a single casting. The casting was analyzed for oxygen, nitrogen, hydrogen and carbon, and found to contain 56 p.p.m. $O_2$, 17 p.p.m. $N_2$, 5 p.p.m. $H_2$ and 80 p.p.m. carbon. The casting was divided into four parts. 100 p.p.m. $O_2$ was added to the first part. 250 p.p.m. $O_2$ to the second part, and 200 p.p.m. carbon to the third part by arc casting the respective alloy parts with $O_2$ and carbon. The oxygen was added as $ZrO_2$ the carbon as ZrC. No addition was made to the fourth part. Each of the alloy portions was cold swaged 51% to 0.15 to 0.20 inch and re-analyzed. The results agreed with the synthetic addition; the analysis for the alloy containing no additive corresponded to its analysis prior to cold swaging. The alloy portions were then annealed at 800° C. for about 15 minutes to induce formation of a precipitated phase and then cold-worked to a final diameter of about 0.016 inch.

Figure 1:
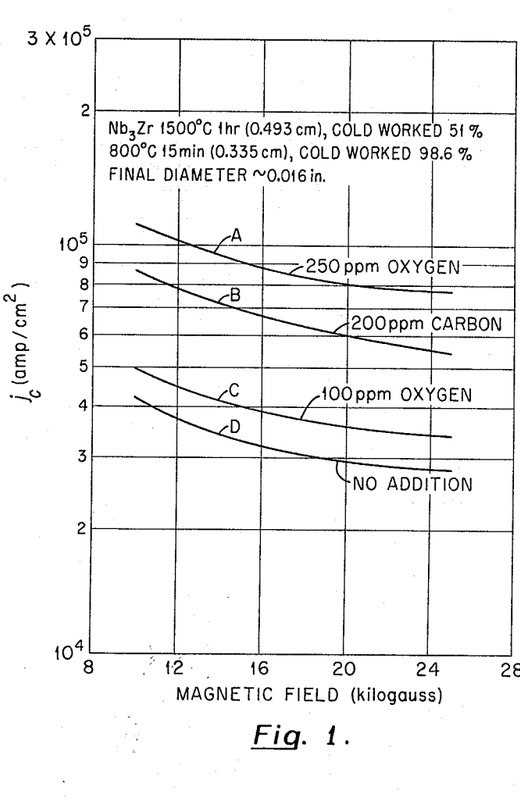
FIG. 1 is a graph showing the effect of carbon and oxygen on the critical current density, $j_c$, as a function of a magnetic field applied transversely to the direction of current flow in a niobium-zironcium alloy wire at 4.2° K. in liquid helium.

The effects of oxygen and carbon addition on the critical current density of the wires fabricated in this manner are shown in FIG. 1. Referring to FIG. 1, it will be seen that alloy specimen with the added oxygen and carbon (curves A, B and C) are characterized by a considerably heightened critical current density in comparison to the wire having no such addition (curve D). Thus, at a transversley applied magnetic field of 20 kilogauss the critical density of the alloy test wire to which no addition of oxygen or carbon had been made was about $3 \times 10^4$ amp./cm.$^2$ whereas the alloy test wire specimen (curve A) which contained an addition of 250 parts per million oxygen followed by heat treatment precipitation at 800° C. to form an oxygen-containing precipitated phase, the critical current density at the same applied magnetic field, was increased to $8 \times 10^4$ amp./cm.$^2$. That the addition of the stipulated amounts of oxygen or carbon does not, by itself, increase the critical current density of the fabricated wires without the existence of a precipitated secondary phase containing said additive is shown by the following example.

Example II

Figure 2:
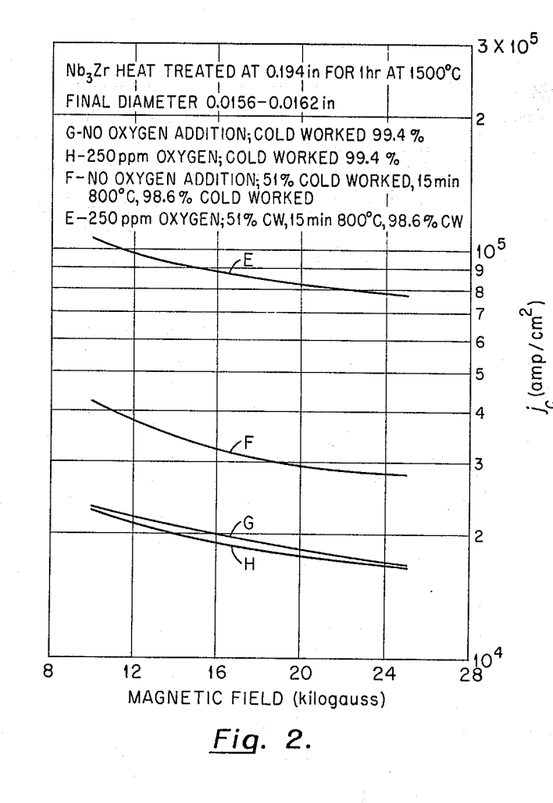
FIG. 2 is a graph on which is plotted the critical current density of several alloy wires as a function of a transversely applied magnetic field, and shows the dependance of the critical density on the presence of oxygen as a precipitated phase in the alloy.

In this experiment, a niobium-zirconium alloy was divided into four parts and fabricated into wires 0.156 to 0.016 inch in diameter in accordance with the schedule shown directly after the legends E, F, G and H of FIG. 2. As shown in curves G and H of FIG. 2, the critical current densities of the specimens, which had not undergone a precipitation heat treatment either with (curve H) or without (curve G) oxygen addition, as zirconium dioxide, were relatively the same. The effect of the heat treatment at 800° C., followed by cold working, on improving the critical density of the alloy is shown by curve F, which represents an alloy specimen containing the original amount of oxygen, with no oxygen addition, but which had been cold worked and heat treated at the precipitation inducing temperature of 800° C. The alloy specimen (curve E) to which oxygen was added to the extent of 250 parts per million and which had been subjected to a combination of cold working and heat treatment at the precipitation-induced temperature of 800° C. was characterized by a critical current density increase by nearly a three-fold factor at the measured applied magnetic fields of 10–25 kilogauss; in comparison to the test specimen (curve H) to which had been added 250 parts per million $O_2$ but which had not undergone a precipitate-inducing heat treatment, the average increase of critical current density was greater by an average factor greater than about 4.

THE SIZE EFFECT

As previously noted, the critical current density of superconducting alloys can be increased by cold working in the absence of a precipitant-inducing heat treatment. However, we have found quite unexpectedly that in certain instances mechanical working of hard superconductors beyond a certain amount may actually cause a decrease rather than an increase in critical current density. On the other hand, we have found that reduced size or diameter of these wires at a fixed amount of cold working strongly increases the critical current density, particularly where the reduction in size is achieved by chemical etching. In order to demonstrate the inter-relationship between this "size effect" and the cold working effects, reference will now be made to the following examples which should be considered in connection with the following drawings: FIG. 3 is a graph on which is plotted the critical current density of niobium-zirconium alloy treated in accordance with the schedules opposite legends I–M in the figure to form wire alloy test specimens fabricated to an average diameter of about 5 mils (0.005 inch) instead of a final diameter of about 16 mils as in the alloy test specimens of FIGS. 1 and 2.

Example III

Figure 3:
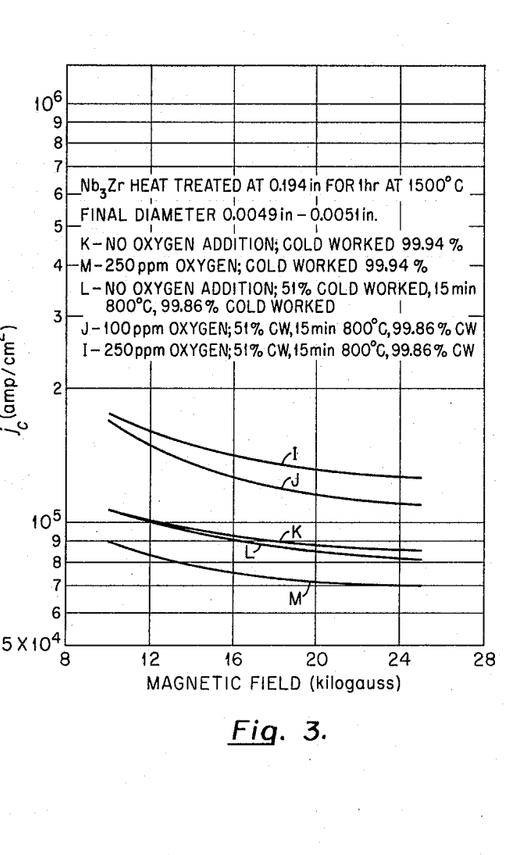
FIG. 3 is a plot similar to FIGS. 1 and 2, showing the variation of current density of a niobium-zirconium alloy fabricated to a wire of considerably lesser diameter than the wires shown in FIGS. 1 and 2. The critical density for these small diameter wires, in comparison to the critical current density of the wires shown in FIGS. 1 and 2, illustrates not only the effect of precipitant-inducing additives of the critical current density, but also indicates that the size of the wire may have a direct influence on the critical current density as well. This size effect will be dealt with later in greater detail.

A niobium-zirconium alloy was treated in accordance with the procedure described in Examples I and II except that in this case the wires were fabricated to final diameter of 5 mils (0.005 inch). The fabrication history of these wires is shown opposite the legends I–M of FIG. 3. Referring to curves I–M of FIG. 3, it will be seen that the same pattern of results demonstrated in the curves of FIGS. 1 and 2 is evident here. That is, whenever a precipitated phase was induced by heat treatment at 800° C. in alloys containing added oxygen, as zirconium oxide, the critical current density was raised in comparison to those cases in which either no additional oxygen was added (curves K and L) or where a precipitating heat treatment was not employed (curve M) even though additions of oxygen were made. Of particular significance, however, is the fact that the critical current density of all of the 5 mil wire was significantly higher than the 16 mil wires which experienced the same fabrication history. For example, the wire test specimen exemplified by legend E and curve E of FIG. 2 underwent nearly the same fabrication history as the wire test specimen exemplified by legend I and curve I of FIG. 3, the only differences being in the diameter of the final wire test specimen and in the amount of cold working. Specifically, the wire test specimen exemplified for curve E experienced a reduction in area of 98.6% while the wire exemplified by curve I experienced a reduction in area of 99.86%. It will be noted that at a transversely applied magnetic field of 20 kilogauss, for example, the critical current density of 16 mil wire was about $8 \times 10^4$ ampere/cm.$^2$ whereas the 5 mil wire displayed a critical current density slightly in excess of $1.5 \times 10^5$ ampere/cm.$^2$ under the same test conditions. This increase could not be due to the increased cold working as will be demonstrated in Example IV below. Therefore, some other factor in addition to the increase in critical current density attributable to cold working and the precipitation of an oxygen-containing additive must apparently contribute to the heightened critical current densities displayed in the curves of FIG. 3 and since the only apparent difference was with respect to the final diameter of the wire test specimen, it suggests that size must contribute in some way to the heightened observed critical current densities as shown by the curves of FIG. 3.

*Example IV*

Figure 7:
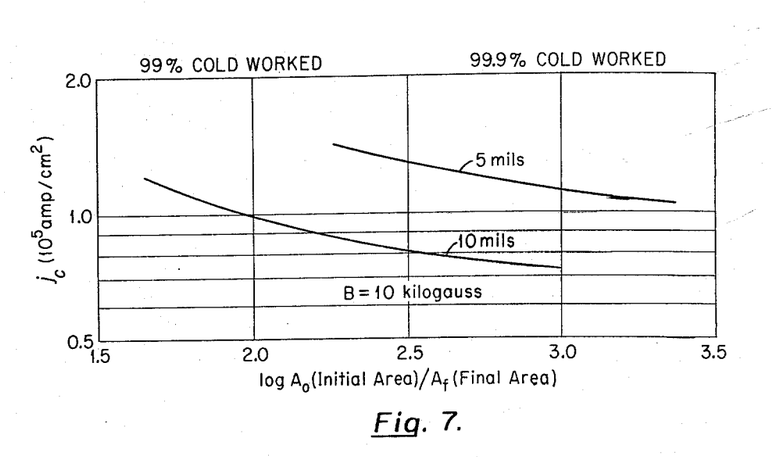
In FIGS. 7 and 8 the critical current density of the wire test specimens as measured at two field strengths are plotted against the logarithm of the ratio of the initial and final cross-sectional area of the wire and show the effect of cold working wire test specimens to effect a mechanical reduction in excess of 99% reduction in area.
Figure 8:
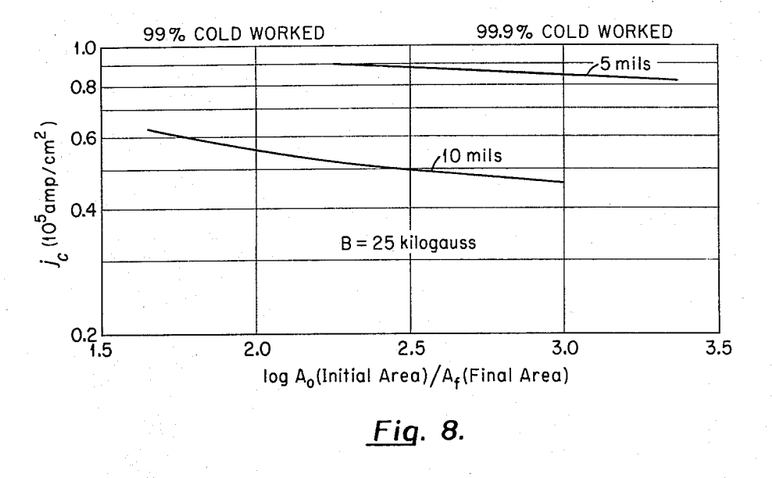

This example is designed to isolate the effects of mechanical cold working from the contemporaneous effects of size reduction and to demonstrate any difference which these parameters have on the critical current density of superconducting alloy test specimens. In order to do this, alloy wires were fabricated to a constant diameter via a fabrication procedure which was exactly the same for each specimen except that the amount of mechanical cold working was applied as follows:

An alloy ingot 350 mils in diameter containing 50 parts per million oxygen was mechanically worked to wires of different diameters, 305 mils to 65 mils, and equal lengths were then homogenized at 1500° C. to erase any compositional variations therein and to evenly distribute the oxygen. Each length was then cold-swaged 48% and annealed at 800° C. for one hour to form a precipitated oxygen-containing phase. The precipitated alloy was then cold worked to a final wire test specimen of 10 mils in diameter. The same procedure was repeated with an alloy ingot to produce final test specimen wires 5 mils in diameter. Thus, two groups of wire test specimens were produced wherein a constant wire diameter was produced with various amounts of cold working. The critical current densities of the final wire test specimens were measured at 4.2° K. at a magnetic field applied transversely to the current flow induced in the wires. The results are shown in the graphs of FIGS. 7 and 8 in which the critical current density is plotted as a function of the logarithm of the ratio between the initial and final cross-section of the wires. It will be seen that reductions in area in excess of 99% actually resulted in a reduction in the critical current densities of the wires rather than an increase as is the case when lesser reductions in area are used in the wire fabrication procedure.

*Example V*

Figure 5:
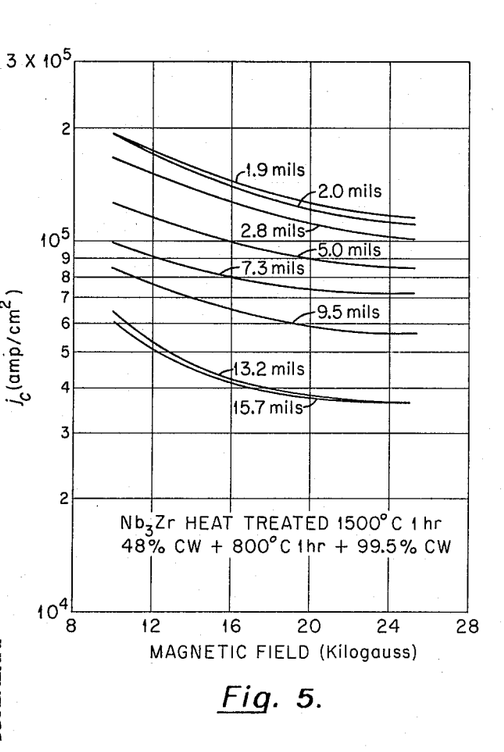
FIG. 5 is a graph on which is plotted the critical current density versus transversely applied magnetic field wherein critical current density of the wires were fabricated with a constant amount of cold reduction by mechanical means.
Figure 6:
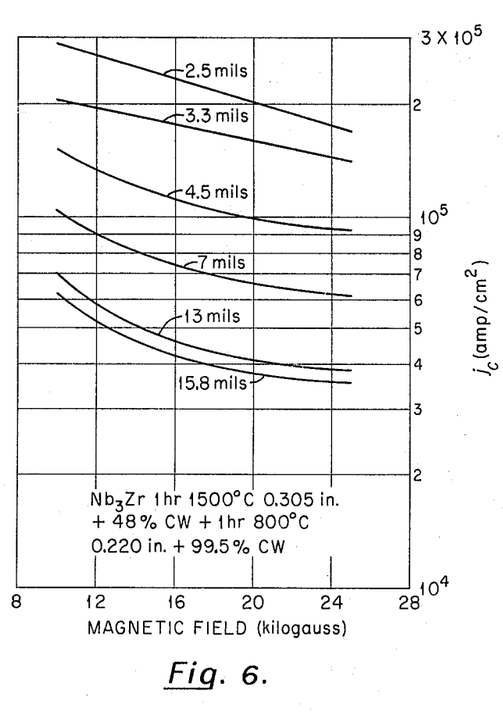
FIG. 6 is a graph with the same coordinates as FIG. 5, showing the effect on the critical current density of alloy wire specimens subjected to the same amount of mechanical cold working as the wire specimen illustrated in FIG. 5 except that the reduction in wire size below about 15.7 mils was effected by chemical etching rather than by mechanical cold reduction means.

This experiment is designed to isolate and demonstrate the effect of size reduction alone on the critical current densities. This was accomplished by cold working the homogenized wire of Example IV from various wire diameters, 305 mils to 60 mils, by an amount of 48% cold reduction to wire diameters 220 mils to 46 mils. Wires of various sizes were then heated for 1 hour at 800° C., and then cold worked 99.5% to a series of sizes from 15.7 mils to 1.9 mils. The final test specimens in these cases were thus of exactly the same fabrication, but of widely different wire diameter. The results for wire treated in this manner are shown in FIG. 5. The second part of the experiment to isolate and demonstrate the effect of size reduction alone was accomplished by chemical etching. Wires of 15.8 mils diameter were prepared by the same fabrication as the wire of FIG. 5. The wire was then further reduced in size from 15.8 mils by chemical etching by immersing in a 75–25 (weight percent) nitric acid-hydrofluoric acid solution for a few seconds at a time to remove no more than a few mils. After immersion, the wire was rinsed, cleaned and dried, and its critical current density measured. The results are shown in the graph of FIG. 6. A comparison of critical current densities of the wires prepared in various diameters by cold drawing 99.5%, as in FIG. 5, as opposed to wires reduced by non-mechanical means such as by etching, as in FIG. 6, clearly shows that the chemically-etched wires reduced to below about 7 mils in diameter have higher critical current densities than the corresponding wires which were reduced by mechanical working means.

Figure 4:
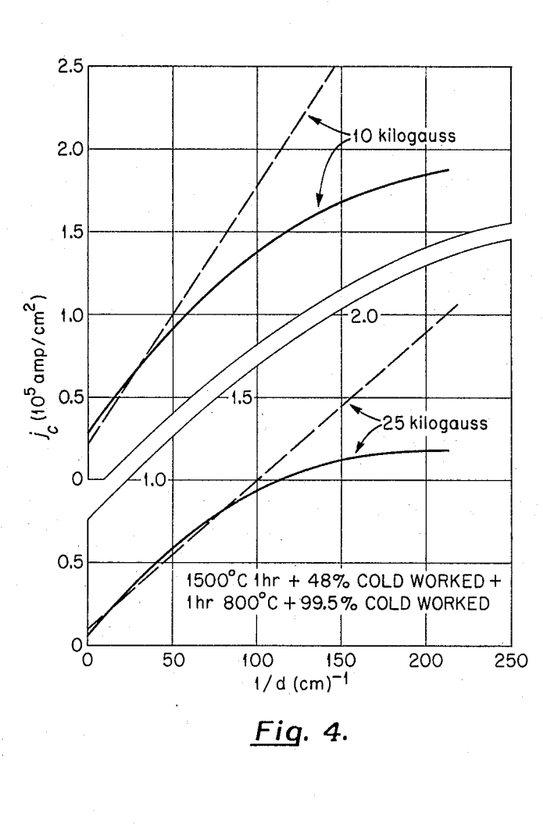
FIG. 4 is a graph on which is plotted the critical current density as a function of the reciprocal diameter of the wire test specimen and which shows the divergence of measured critical current density of wires which have been fabricated in exactly the same manner except that in one case the final size reduction to wire less than about 5 mils was effected by chemical etching instead of by mechanical means such as by cold working.

In order to show the relative effects of size reduction by mechanical working operations versus size reduction by non-mechanical means such as by chemical etching even more clearly, reference is made to the graph of FIG. 4 which is a plot of critical current density versus reciprocal diameter of the wires fabricated in this example as measured at 10 kilogauss in one case and at 25 kilogauss in another. The dashed line curves of FIG. 6 represent the characteristics of the chemically etched wires and the solid lines represent characteristics of the mechanical reduced wires. It will be noted that at the larger diameters the mechanically reduced wires have the same critical current densities as the etched wires. However, as the diameter of the wires decreases beyond 100 reciprocal centimeters the critical densities of the etched wires are characterized by an ascending slope while the mechanical worked wires appear to be approaching a constant critical current density. It will thus be apparent that chemical etching of wires beyond a certain wire diameter size serves to increase the critical current density by a factor in excess of that increase in critical current density achievable by a combination of cold working and that increase in critical current density attributable to the formation of an induced precipitated phase and containing the selective additives previously defined. The exact wire diameter size at which the beneficial effects of size reduction by non-mechanical means such as by chemical etching will be noticeable and will vary depending upon the composition of the superconductor, the additive used to induce the precipitated phase, the prior fabrication history of the wire treated, and the magnitude of the transversely applied magnetic field used to generate current flow in the wire. In this manner, i.e., chemical etching, after no further increase in critical current density could be made by precipitation and cold working, we increased the critical current density still further with size reduction via chemical etching. In this manner, in the example improved Nb-Zr superconductors with a critical current density of 320,000 amps./cm.$^2$ at 250,000 gauss and 4.2° K. were made.

While we have described the combined effects of an induced precipitated phase and size reduction in a unitary process to accomplish maximum increase in a given hard superconductor, it should be understood that the precipitated phase aspect of this invention and the size reduction aspect can be practiced alone or in combination with other fabrication sequences not particularly described herein. The particular fabrication sequence utilizing either one or both aspects of this invention will be a matter of choice with those seeking to practice this invention and will depend in large measure on the degree of heightened critical current density desired to be achieved with a given hard superconducting material. For achieving a maximum increase in the critical current density of a given wire made from a hard superconducting alloy, the fabrication sequence should include induction of the described precipitant-inducing additive containing the defined additive, cold working prior to and/or after the precipitation of the additive and size reduction beyond the point where mechanical working such as by cold working no longer affects the superconductivity of the fabricating alloy.

What we claim is:

1. A method of increasing the critical current density of a hard superconducting alloy which comprises:
   (a) mixing in the liquid state a hard superconducting alloy system whose equilibrium phase diagram displays a multiphase region below a substantially homogeneous solid phase with an additive selected from the group oxygen, carbon, nitrogen, boron and hydrogen;

(b) homogenizing the resultant mixture at a temperature within the homogeneous solid phase region of original alloy system to erase compositional variations;

(c) heat-treating the homogenized mixture within a multiphase region displayed by said phase diagram for a period of time sufficient to produce precipitation of a secondary phase; and (d) cooling said heat-treated alloy to retain said secondary phase.

2. A method of increasing the critical current density of a hard superconducting alloy which comprises:

(a) mixing in the liquid state a hard superconducting alloy system whose equilibrium phase diagram displays a multiphase region below a substantially homogeneous solid phase with an additive selected from the group oxygen, carbon, nitrogen, boron and hydrogen, said additive being preferably in the form of a compound of the formula MX where: M is an element having an electronegativity value which is less than the electronegativity value of the element comprising the major alloying ingredient of said alloy and X is selected from oxygen, carbon, nitrogen, boron and hydrogen;

(b) homogenizing the resultant mixture at a temperature within the homogeneous solid phase region of original alloy system to erase compositional variations;

(c) heat-treating the homogenized mixture within a multiphase region displayed by said phase diagram for a period of time sufficient to induce precipitation of a secondary phase; and (d) cooling said heat-treated alloy to retain said secondary phase.

3. A method of increasing the critical current density of a hard superconducting alloy which comprises:

(a) mixing in the liquid state a hard superconducting alloy system whose equilibrium phase diagram displays a multiphase region below a substantially homogeneous solid phase with an additive selected from the group oxygen, carbon, nitrogen, boron and hydrogen, said additive being preferably in the form of a compound of the formula MX where M is an element having an electronegativity value which is less than the electronegativity value of the element comprising the major alloying ingredient of said alloy and X is selected from oxygen, carbon, nitrogen, boron and hydrogen;

(b) homogenizing the resultant mixture at a temperature within the homogeneous solid phase region of the original alloy system to erase compositional variations;

(c) heat-treating the homogenized mixture within a multiphase region displayed by said phase diagram for a period of time sufficient to induce precipitation of a secondary phase;

(d) cooling said heat-treated alloy to retain said secondary phase; and (e) passing an electrical current through said heat-treated allow containing said precipitated phase at or below its critical temperature.

4. The method according to claim 3 wherein the heat-treated alloy is cold-worked.

5. The method according to claim 3 wherein the heat-treated alloy is cold-worked before precipitation.

6. The method according to claim 3 wherein the heat-treated alloy is cold-worked after precipitation.

7. A method of increasing the critical current density of a hard superconducting alloy which comprises mixing said alloy in the liquid state with an additive selected from the group oxygen, carbon, nitrogen, boron, and hydrogen, homogenizing the resultant mixture at a temperature below the melting point of said alloy to effect uniform distribution of said additive, cooling the resultant homogenized alloy to induce formation of a finely divided precipitated phase containing said additive and thereafter reducing said alloy to a desired gauge size.

8. The method according to claim 2 in which the heat-treated alloy is cold-worked.

9. A method of increasing the critical current density of a hard superconducting alloy containing a homogeneously distributed precipitated phase containing an additive selected from oxygen, carbon, nitrogen, boron and hydrogen which comprises reducing said alloy by non-mechanical means to a diameter below which the critical current density of said alloy would not be increased by mechanical means.

10. The method according to claim 9 wherein the diameter of said alloy containing said precipitated phase is reduced by chemical etching.

11. A method of increasing the critical current density of a hard superconducting alloy which comprises:

(a) mixing in the liquid state a hard superconducting alloy system whose equilibrium phase displays a multiphase region below a substantially homogeneous solid phase with an additive selected from the group oxygen, carbon, nitrogen, boron and hydrogen;

(b) homogenizing the resultant mixture at a temperature within the homogeneous solid phase region of the original alloy system to erase compositional variations;

(c) heat-treating the homogenized mixture within a multiphase region displayed by said phase diagram for a period of time sufficient to produce precipitation of a secondary phase;

(d) cooling said annealed alloy to retain said secondary phase; and (e) mechanically working the resultant alloy to a wire gauge, and then further reducing the wire by non-mechanical means.

12. A hard superconducting alloy having a metallurgical structure comprising a homogeneously distributed precipitated phase containing an additive selected from carbon, oxygen, nitrogen, boron and hydrogen at a concentration which enhances the superconductivity of said alloy relative to the superconductivity in the absence of said phase.

13. A hard superconducting alloy having a metallurgical structure comprising a homogeneously distributed precipitated phase containing an additive selected from carbon, oxygen, nitrogen, boron and hydrogen at a concentration which enhances the superconductivity of said alloy relative to the superconductivity at a lesser concentration of said additive.

14. A hard superconducting alloy having a metallurgical structure comprising a homogeneously distributed precipitated phase containing a compound of the formula MX where M is a metal having an electronegativity value which is less than the electronegativity value of the metal comprising the major alloying ingredient of said alloy and X is selected from an oxide, carbide, nitride, boride and hydride of M, said compound being present in a concentration which enhances the superconductivity relative to the superconductivity of the alloy in the absence of said precipitated phase.

15. A method of increasing the critical current density of a hard superconducting alloy which comprises mixing said alloy in the liquid state with an additive selected from the group oxygen, carbon, nitrogen, boron and hydrogen, homogenizing the resultant mixture at a temperature below the melting point of said alloy to effect uniform distribution of said additive, annealing the resultant homogenized alloy to induce formation of a uniformly distributed finely divided precipitated phase containing said additive, and then mechanically working the resultant alloy to a desired gauge size.

16. The method according to claim 7 in which the alloy being treated is a niobium-base alloy.

17. The method according to claim 11 in which the alloy being treated is a niobium-base alloy.

References Cited by the Examiner

UNITED STATES PATENTS

| 3,056,672 | 10/1962 | Clark | 75—174 |
| 3,167,692 | 1/1965 | Matthias | 75—175.5 |
| 3,181,946 | 5/1965 | McAndrew | 75—17 |

OTHER REFERENCES

"Columbium Base Alloys," Materials and Processes Applied Research Operation Flight Propulsion Laboratory Department, General Electric, February 1962.

DAVID L. RECK, *Primary Examiner.*

C. N. LOVELL, *Assistant Examiner.*